(12) United States Patent
Gillipalli et al.

(10) Patent No.: US 11,689,755 B2
(45) Date of Patent: Jun. 27, 2023

(54) SYSTEMS AND METHODS FOR GENERATING SCALABLE PERSONALIZED RECOMMENDATIONS BASED ON DYNAMIC AND CUSTOMIZED CONTENT SELECTIONS AND MODELING OF THE CONTENT SELECTIONS

(71) Applicant: Verizon Patent and Licensing Inc., Basking Ridge, NJ (US)

(72) Inventors: Vamshi Gillipalli, Irving, TX (US); Haripriya Srinivasaraghavan, Plano, TX (US); Yogalakshmi Narayanasamy, San Jose, CA (US); Praveen Kumar Bandaru, Irving, TX (US); Sirisha Sripathi, San Jose, CA (US); Abhishek A. Desai, Irving, TX (US); Zhiqun Wang, Sammamish, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/382,031

(22) Filed: Jul. 21, 2021

(65) Prior Publication Data
US 2023/0028389 A1 Jan. 26, 2023

(51) Int. Cl.
| | |
|---|---|
| H04N 21/25 | (2011.01) |
| H04N 21/482 | (2011.01) |
| G06F 16/738 | (2019.01) |
| G06F 16/735 | (2019.01) |
| H04N 21/454 | (2011.01) |

(52) U.S. Cl.
CPC ......... *H04N 21/251* (2013.01); *G06F 16/735* (2019.01); *G06F 16/738* (2019.01); *H04N 21/454* (2013.01); *H04N 21/4826* (2013.01)

(58) Field of Classification Search
CPC .............. H04N 21/251; H04N 21/454; H04N 21/4826; G06F 16/738; G06F 16/735
See application file for complete search history.

(56) References Cited

U.S. PATENT DOCUMENTS

| | | | |
|---|---|---|---|
| 10,511,481 B1* | 12/2019 | Castellanos | ......... H04L 41/0883 |
| 2012/0101966 A1* | 4/2012 | van Coppenolle | ..... H04L 12/00 706/20 |
| 2013/0014223 A1* | 1/2013 | Bhatia | ................ H04N 21/2668 726/4 |

(Continued)

*Primary Examiner* — Sumaiya A Chowdhury

(57) ABSTRACT

Disclosed is a system for generating personalized recommendations based on dynamic and customized content selections and modeling of the content selections. The system may receive a request with an identifier and a query, and may obtain a particular recommendation configuration based the identifier and the query. The system may retrieve a set of content that satisfies the query and that is identified with at least one content prioritization parameter specified in the particular recommendation configuration, may generate a set of models of one or more model types that model relevance between the set of content and a different event specified in the particular recommendation configuration, and may compute a score for each content in each model based on the modeled relevance. The system may present recommended content in a different order than the set of content based on aggregate scores compiled for each content from the set of models.

20 Claims, 9 Drawing Sheets

(56) References Cited

U.S. PATENT DOCUMENTS

2013/0290339 A1* 10/2013 LuVogt .............. G06F 16/9535
707/E17.089
2018/0157759 A1* 6/2018 Zheng ................ G06F 16/9038

* cited by examiner

SYSTEMS AND METHODS FOR GENERATING SCALABLE PERSONALIZED RECOMMENDATIONS BASED ON DYNAMIC AND CUSTOMIZED CONTENT SELECTIONS AND MODELING OF THE CONTENT SELECTIONS

BACKGROUND

Recommendation systems attempt to select relevant content for different users based on preferences of those users. However, the recommendation systems may apply the user preferences uniformly across all types of content. For instance, the same user preferences may be used to select between linear or on-demand content, content of different genres (e.g., news, sports, science fiction, documentary, etc.), content that is accessed at different times of day, and/or other differentiated content types within the recommendation system content library. The uniform application of the user preferences across all content types may result in recommendations that are based on irrelevant user preferences and/or user preferences that incorrectly bias the recommendation of different content types.

DETAILED DESCRIPTION OF EXAMPLE EMBODIMENTS

Figure 1:
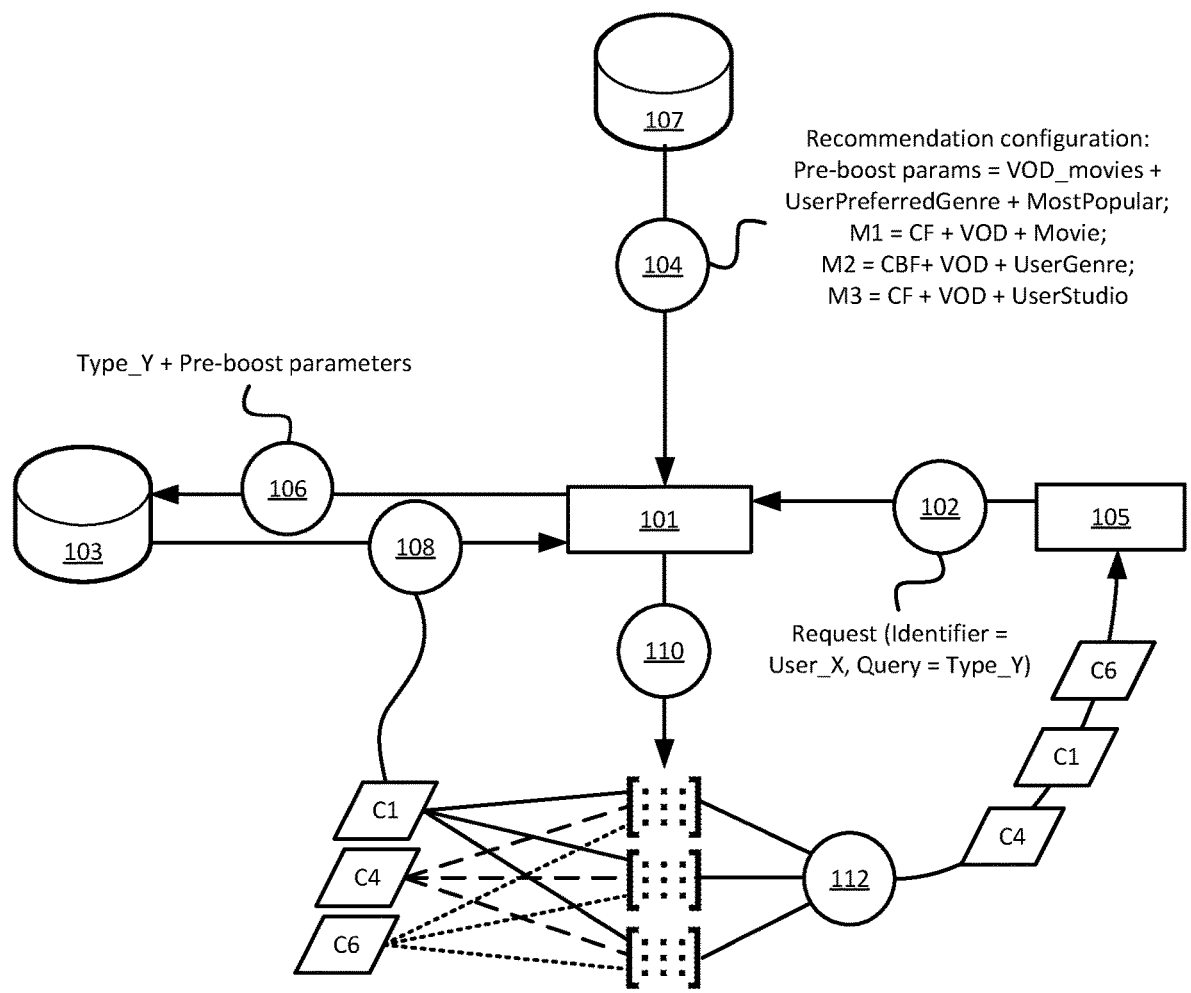
FIG. 1 illustrates an example of generating personalized recommendations based on dynamic and customized content selections and modeling of the content selections in accordance with some embodiments.

The following detailed description refers to the accompanying drawings. The same reference numbers in different drawings may identify the same or similar elements.

Embodiments described herein provide systems and methods for generating scalable personalized recommendations based on dynamic and customized content selections and modeling of the content selections. The recommended content may include digital items (such as streaming content, downloadable movies or audio files, or the like), physical items, multimedia programming, services, and/or other searchable offerings.

In some embodiments, generating the personalized recommendations may include selecting and/or dynamically generating different recommendation configurations in response to user requests for different types of content. Each recommendation configuration may specify using a different subset of models, user preferences, and/or content attributes to customize the selection of a set of content that is relevant or interesting for the requested content type. Consequently, a dynamic recommendation system of some embodiments may use different user preferences of the same user to select different sets of content in response to requests from the same user for different content types, and/or may use different user preferences of different users to select different sets of content in response to requests from the different users for the same content type.

Each recommendation configuration may further specify generating different customized models to model the similarity between the selected set of content and a different set of filtered events, and/or a procedure for evaluating the customized models. The different customized models may use content-based filtering, collaborative filtering, and/or other techniques for different modeling or measuring of the similarity, and/or may use different events corresponding to different subsets of tracked activity and/or preferences by a user to evaluate the relevance or interest of the selected set of content for the requesting user. The dynamic recommendation system may change the weighting, ordering, and/or ranking of the selected set of content based on scores that are attributed to the content as a result of evaluating the customized models according to the recommendation configuration procedure, and may provide customized recommendations or predictions by altering the presentation of the selected set of content based on the changed weighting, ordering, and/or ranking. Accordingly, in some embodiments, the dynamic recommendation system may account for different preferences that each user has at different times (in a day, week, month, season, etc.), for different channels or streaming providers, for different genres of content, for content with specific actors or personalities, for linear or live content versus video on-demand ("VOD") content, and/or for other types of content when selecting the content to present to each user and in determining the order with which to present the selected content to the user.

Dynamically generating the recommendation configurations may include determining different events, event types, event weights, models, model variants, and/or evaluations to use in generating the personalized recommendations upon receipt of a request based on one or more properties associated with the requesting user, the request query, and/or other variables of the request or a recommendation configuration definition. For example, the recommendation configuration for VOD content may have a variable definition that changes from using a first set of events, event types, event weights, models, and/or model variants to using a second set of events, event types, event weights, models, and/or model variants in response to the same query arriving at different times, different queries for VOD content, and/or different users submitting the requests. Consequently, the dynamic recommendation system may dynamically modify or generate a particular recommendation configuration for VOD content in order to generate and/or recommend a first rail of content that prioritizes "action movies" at a first time, for a first set of queries, and/or for a first set of users, and to generate and/or recommend a second rail of content that prioritizes "popular TV shows" at a second time, for a second set of queries, and/or for a second set of users.

The recommendation configuration selection and/or generation may setup a varying events funnel with different event types and different event weights, and/or a varying pipeline that filters recommended content based on different models or model variants that are generated from modeling of the events funnel. This dynamic definition of a particular recommendation configuration may produce different recommendations and/or results for the same request at different times, different requests, and/or different users as a result of varying the modeled events or event types, the weights attributed to the modeled events, the models or model variants used in modeling the events or event types, and/or the order of evaluation.

FIG. 1 illustrates an example of generating the personalized recommendations based on the dynamic and customized content selections and modeling of the content selections in accordance with some embodiments. The personalized recommendations may be generated by dynamic recommendation system 101. In some embodiments, dynamic recommendation system 101 may be part of a media or content distribution platform (e.g., a provider of linear or VOD content), and/or may have access to content library 103 of the media or content distribution platform. In some other embodiments, dynamic recommendation system 101 may be part of an online merchant, and/or may have access to content library 103 of the online merchant.

In some embodiments, content library 103 may be, may include, and/or may be communicatively coupled to a repository that stores different media streams, files, products, services, and/or other items that may be purchased, rented, used, and/or otherwise accessed. In some other embodiments, content library 103 may be, may include, and/or may be communicatively coupled to a database that tracks usage, availability, and/or access metrics of the different media streams, files, products, services, and/or other items. For instance, content library 103 may identify one or more channels that stream different linear or live content and/or provide downloadable files for different VOD content that may be accessed at any time by different users.

As shown in FIG. 1, dynamic recommendation system 101 may receive (at 102) a request from user equipment ("UE") 105. UE 105 may include a network-connected device, such as a mobile phone, a tablet, a desktop computer, a "smart" device, etc., that a particular user uses to request and receive different content from dynamic recommendation system 101.

The request may be distributed as a HyperText Transfer Protocol ("HTTP") GET message, a search query, or other type of message that is passed over a data network such as the Internet. The request may include an identifier that identifies UE 105 or the particular user associated with UE 105. The identifier may correspond to a Subscription Permanent Identifier ("SUPI"), a Globally Unique Temporary Identifier ("GUTI"), a Mobile Directory Number ("MDN"), an Internet Protocol ("IP") or other network address, login information of the particular user, a hash value provided to UE 105 after a successful login, and/or other identifying information. The request may further include a query for specific content or a specific type of content. For instance, the request may include a Uniform Resource Locator ("URL") or other value that requests a particular channel of linear content, a particular genre of linear and/or VOD content, content with a specific actor or personality, content that is available during a specific time interval, movies, animations, shows, and/or other types of content.

Dynamic recommendation system 101 may obtain and/or generate (at 104) a recommendation configuration for the received (at 102) request. In some embodiments, dynamic recommendation system 101 may obtain (at 104) the recommendation configuration that is defined for the requested content type from configuration datastore 107. Configuration datastore 107 may store different recommendation configurations that define the generation of personalized recommendations for different types of content. Each recommendation configuration may include pre-boost parameters that specify the subset of user preferences and/or content attributes to use for the dynamic content selection, a definition of models to use in determining the similarity between the selected content and a filtered set of events, and/or a procedure with which to evaluate the models and rank the selected content. In some other embodiments, dynamic recommendation system 101 may generate (at 104) the recommendation configuration by retrieving a recommendation configuration with a variable definition from configuration datastore 107 based on the requested content or request query, and by customizing the pre-boost parameters, events modeling, model evaluations, and/or other variables within the variable definition based on preferences of the requesting user, aggregate user preferences (e.g., most popular content at a certain time), available models, available content, and/or data obtained by dynamic recommendation system 101 at the time of the request. In still some other embodiments, dynamic recommendation system 101 may generate (at 104) the recommendation configuration by dynamically determining the pre-boost parameters, dynamically creating the events funnel, and/or dynamically establishing the modeling pipeline for the recommendation configuration at the time of the request based on timing of the request, user preferences, aggregate user preferences, available models, available content, and/or data obtained by dynamic recommendation system 101 at the time of the request.

Dynamic recommendation system 101 may query (at 106) content library 103 using the request query and the pre-boost parameters from the recommendation configuration. Dynamic recommendation system 101 may receive (at 108) an initial set of content from content library 103 that satisfies or matches the request query and the pre-boost parameters.

In some embodiments, the pre-boost parameters may directly specify the user preferences and/or content attributes for selecting (at 106) the initial set of content. For instance, the pre-boost parameters may specify retrieval of VOD comedy movies that were recently made available (e.g., in the past month). Additionally, the pre-boost parameters may specify aggregate user preferences. The aggregate user preferences may identify the content that is most viewed, most requested, most recently accessed, most popular, and/or of most interest within content library 103. Dynamic recommendation system 101 may track and/or define different aggregate user preferences for different content, different content types (e.g., different genres, channels, etc.), and/or for all content within content library 103.

In some other embodiments, the pre-boost parameters may be customized and/or qualified based on user preferences associated with UE 105. In other words, dynamic recommendation system 101 may dynamically define different pre-boost parameters when obtaining and/or generating a particular recommendation configuration for different requests based on variables of the different requests. For instance, the pre-boost parameters may be defined as VOD movies in the preferred genre of the requesting user. In this case, dynamic recommendation system 101 may qualify the pre-boost genre parameter by retrieving the user profile that stores the preferences of the requesting user, and by determining the preferred genre of the requesting user from the user profile.

Dynamic recommendation system 101 may populate the user profile with different preferences and/or entitlements of the user by monitoring and/or recording past viewing habits and/or other activity of the particular user. For instance, the user profile may indicate that the particular user prefers watching a particular linear channel at a first time of day, watching movies of a particular genre at a second time of day, has a preference for shows involving a particular actor, and has a preference for a particular sport over other sports. The preferences may therefore span different content types or categories, and may be qualified temporally to apply to specific days of the week, times of the day, and/or other time intervals. The entitlements included within the user profile may track purchases, rentals, subscriptions, authorizations, settings, and/or other permissions associated with UE 105 or the user associated with UE 105. Dynamic recommendation system 101 may retrieve the user profile by hashing or performing a lookup of the request identifier from the received (at 102) request.

Accordingly, the selection of the set of content based on the pre-boost parameters may include filtering and selecting content from content library 103 that satisfies or matches content or content types specified in the request query, pre-boost parameters that are specifically defined in the recommendation configuration, pre-boost parameters that are dynamically generated from individual preferences of the particular user submitting the request, pre-boost parameters that are qualified by aggregate user preferences, and/or parameters for the requested content or content type. As shown in FIG. 1, the recommendation configuration obtained and/or generated (at 104) for the received (at 102) request may include pre-boost parameters for content that matches the VOD type, movies type, the preferred genre of the requesting user, and is the most popular in the user preferred genre. Consequently, dynamic recommendation system 101 may retrieve different sets of content for the same request issued by users with different genre preferences, or may retrieve different sets of content for the same request issued by the same user at different times when the most popular content changes for VOD movies of the user preferred genre.

Dynamic recommendation system 101 may reorder, rank, and/or otherwise adjust the presentation of the set of content by using a customized set of models to determine the proximity, similarity, or relevance of the set of content to customized events that are specified for the customized set of models. The customized set of models and/or customized events may be defined in the recommendation configuration, may be determined at request time based on a variable definition provided in the configuration definition for the models and events and data that dynamic recommendation system 101 obtains for the variable definition at request time, and/or may be dynamically established at request time based on different models and/or events that are available at request time and/or the data that dynamic recommendation system 101 obtains at request time.

The customized events may include a filtered subset of user events, aggregated user events, and/or content attributes. The user events may include previous actions or activity, preferences, entitlements, and/or other data that is tracked for the requesting user. The user events may be obtained from the user profile of the requesting user. The aggregated user events may include collective actions or activity, preferences, entitlements, and/or other data that is tracked for all users or a group of users. The content attributes may include metadata, content types, and/or other data with which to differentiate the content stored within content library 103.

In some embodiments, the recommendation configuration may specify generating one or more of the customized set of models using Item-based Content-based Filtering ("ICBF"), User-based Content-based Filtering ("UCBF"), Item-based Collaborative Filtering ("ICF"), User-based Collaborative Filtering ("UCF"), Convolutional Neural Networks ("CNNs"), Recurrent Neural Networks ("RNNs"), Deep Neural Networks ("DNNs"), and/or other modeling techniques. The recommendation configuration may further specify which one or more events to model in each of the customized set of models. For instance, dynamically generating the recommendation configuration may include specifying a first model that uses ICBF to score the proximity, similarity, or relevance between each content from the initial set of content and a first set of events that correspond to a first set of tracked user activity, and a second model that uses ICF to score the proximity, similarity, or relevance between each content from the initial set of content and a second set of events that correspond to a second set of tracked user activity. Dynamically generating the same recommendation configuration at a later time, for a different query, and/or a different user may result in a different modeling pipeline. The different modeling pipeline may model different events, provide different weights to the events being modeled, use different techniques to model the events, and/or evaluate the models in a different sequence.

Dynamic recommendation system 101 may generate (at 110) each of the customized models for the specified events. Each generated model may provide a vector or matrix that contains a set of scores for the proximity, similarity, or relevance of each content from the initial set of content to the modeled event.

Dynamic recommendation system 101 may evaluate (at 112) the customized set of models according to a sequence that is specified as part of the recommendation configuration and/or that is dynamically defined when generating the recommendation configuration. In some embodiments, the evaluation (at 112) may include interleaving the models in the specified sequence. In some embodiments, the evaluation (at 112) may include combining the scores from the different models to determine the content from the initial set of content that is most relevant or most closely matches the preferences and/or interests of the particular user. The scores may be combined using a round-robin technique, by taking the maximum relevance score from each of the model, summing each related score from each of the models, and/or performing other computations using the scores. In any case, the evaluation (at 112) may reorder or rank the content according to the combined scores of the different models, and dynamic recommendation system may present the reordered set of content as personalized recommendations for UE 105.

Figure 2:
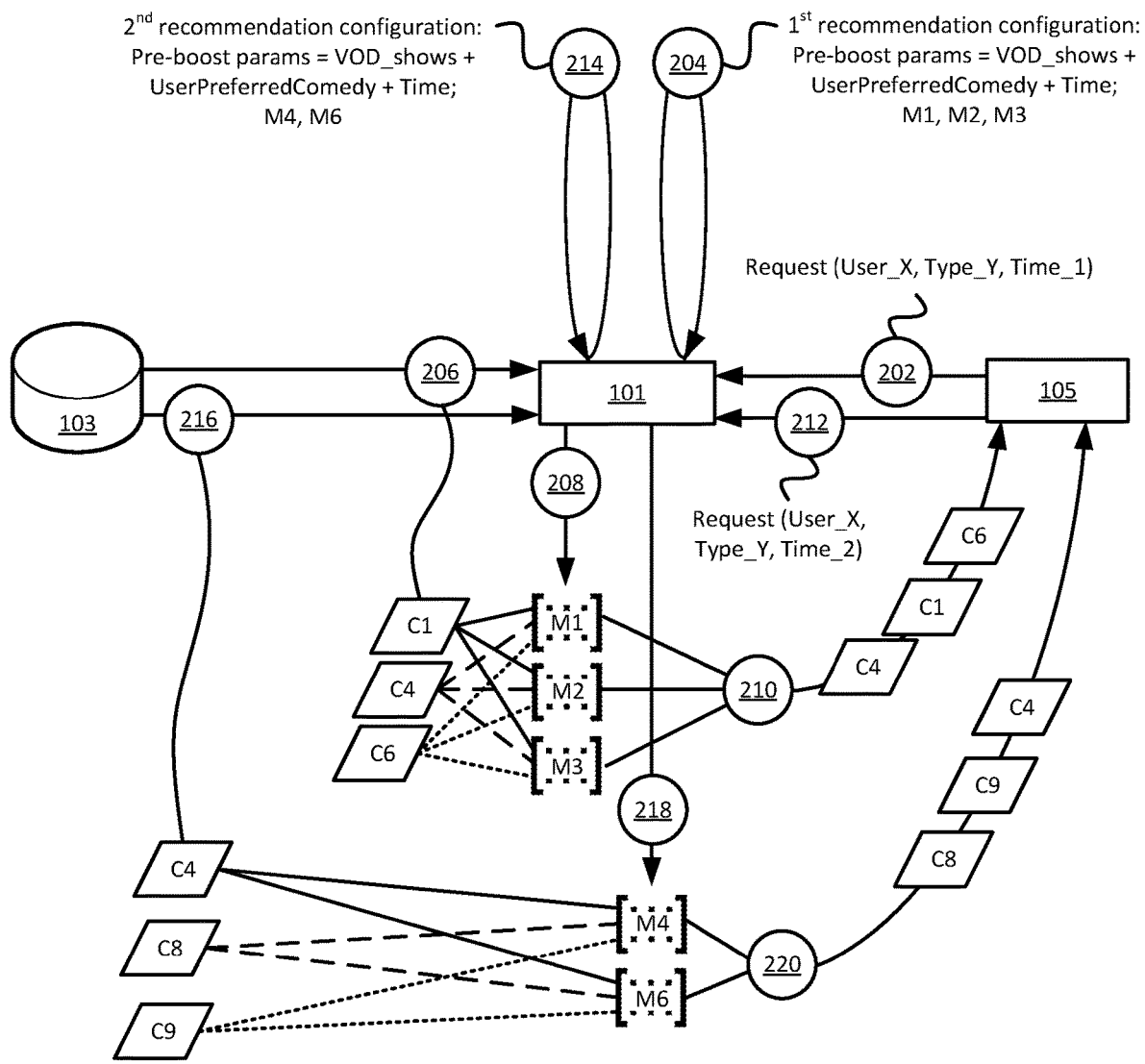
FIG. 2 illustrates an example of generating different recommendations for the same user based on the dynamic content selections and the modeling of different event and content combinations in accordance with some embodiments.

FIG. 2 illustrates an example of generating different recommendations for the same user based on the dynamic content selections and the modeling of different event and content combinations in accordance with some embodiments. As shown in FIG. 2, UE 105 may submit (at 202) a first request for a particular type of content at a first time. For instance, the first request may be for VOD comedy shows.

Dynamic recommendation system 101 may retrieve and/or generate (at 204) a first recommendation configuration for the particular type of content, the first time, and/or one or more preferences of the user associated with UE 105. For instance, dynamic recommendation system 101 may generate the first recommendation configuration to provide a first rail of content that includes VOD comedy shows that are family friendly and do not contain adult themes or profanity for the first time of day.

Dynamic recommendation system 101 may select (at 206) a first set of content based on the pre-boost parameters of the first recommendation configuration, user preferences that qualify one or more of the pre-boost parameters from the first recommendation configuration, and/or aggregate preferences identified by one or more of the pre-boost parameters from the first recommendation configuration. Dynamic recommendation system 101 may model (at 208) the proximity, similarity, and/or relevance of the first set content to a first set of events using one or more content-based filtering, collaborative filtering, and/or other modeling techniques specified by the first recommendation configuration. Dynamic recommendation system 101 may evaluate (at 210) the models in order to compute an aggregate score for each content of the first set of content, and may recommend or predict the first rail of content from the first set of content that is of most interest or relevance to the UE request at the first time based on the aggregate score.

UE 105 may submit (at 212) a second request for the same particular type of content at a second time that is after the first time. For instance, the second request may be directed to the same VOD comedy shows as the first request with the only difference being in the time at which the first and second requests are issued by UE 105.

Dynamic recommendation system 101 may retrieve and/or generate (at 214) a second recommendation configuration for the particular type of content, the second time, and/or one or more preferences of the user associated with UE 105. In some embodiments, dynamic recommendation system 101 may dynamically customize or modify the second recommendation configuration to be different than the first recommendation configuration and/or to provide a second rail of content that includes VOD comedy shows that contain adult themes or profanity and are ordinarily viewed during the second time of day. In some other embodiments, the second recommendation configuration may be the same as the first recommendation configuration with each recommendation configuration including pre-boost parameters and modeling events that are time dependent and/or that reference different time-defined preferences of the user. For instance, the first and second recommendation configurations may specify the same pre-boost parameter or modeled event that reference a time-based preference from the user profile, and the user profile may include a first preference for family friendly comedy shows during the first time, and a second preference for adult comedy shows during the second time.

Dynamic recommendation system 101 may select (at 216) a second set of content based on the pre-boost parameters of the second recommendation configuration, user preferences that qualify one or more of the pre-boost parameters from the second recommendation configuration, and/or aggregate preferences identified by one or more of the pre-boost parameters from the second recommendation configuration. In some embodiments, the second set of content may be different than the first set of content as a result of the pre-boost parameters from the second recommendation configuration differing from those of the first recommendation configuration.

Dynamic recommendation system 101 may model (at 218) the proximity, similarity, and/or relevance of the second set content to a second set of events using one or more content-based filtering, collaborative filtering, and/or other modeling techniques specified by the second recommendation configuration. In some embodiments, the second recommendation configuration may specify using different modeling techniques or modeling different events than the first recommendation configuration. For instance, the first recommendation configuration may specify using UCBF to model a particular event, whereas the second recommendation configuration may specify using UCF to model the particular event. Alternatively, the modeled events specified in the first and second recommendation configurations may be the same, but the values for those events may be time-dependent and change when modeling (at 218) the second set of content. For instance, the modeled event may be for a time-dependent user preference on the type of comedy show preferred by the user at different times of day such that the first set of content is modeled (at 208) relative to a family-friendly comedy preference, and the second set of content is modeled (at 218) relative to an adult comedy preference.

Dynamic recommendation system 101 may evaluate (at 220) the models specified by the second recommendation configuration in order to compute an aggregate score for each content of the second set of content, and may provide the second rail of content to the UE request at the second time that is different than the first rail of content provided to the UE request at the first time despite UE 105 submitting the same request at the different times. By dynamically modifying the recommendation configuration at request time and/or including a variable definition for one or more of the pre-boost parameters, modeled events, and/or modeling techniques in the recommendation configuration, dynamic recommendation system 101 is able to produce different recommended rails of content for the same request by accounting for variations in the user preferences and/or variations detected across dynamic recommendation system 101.

Figure 3:
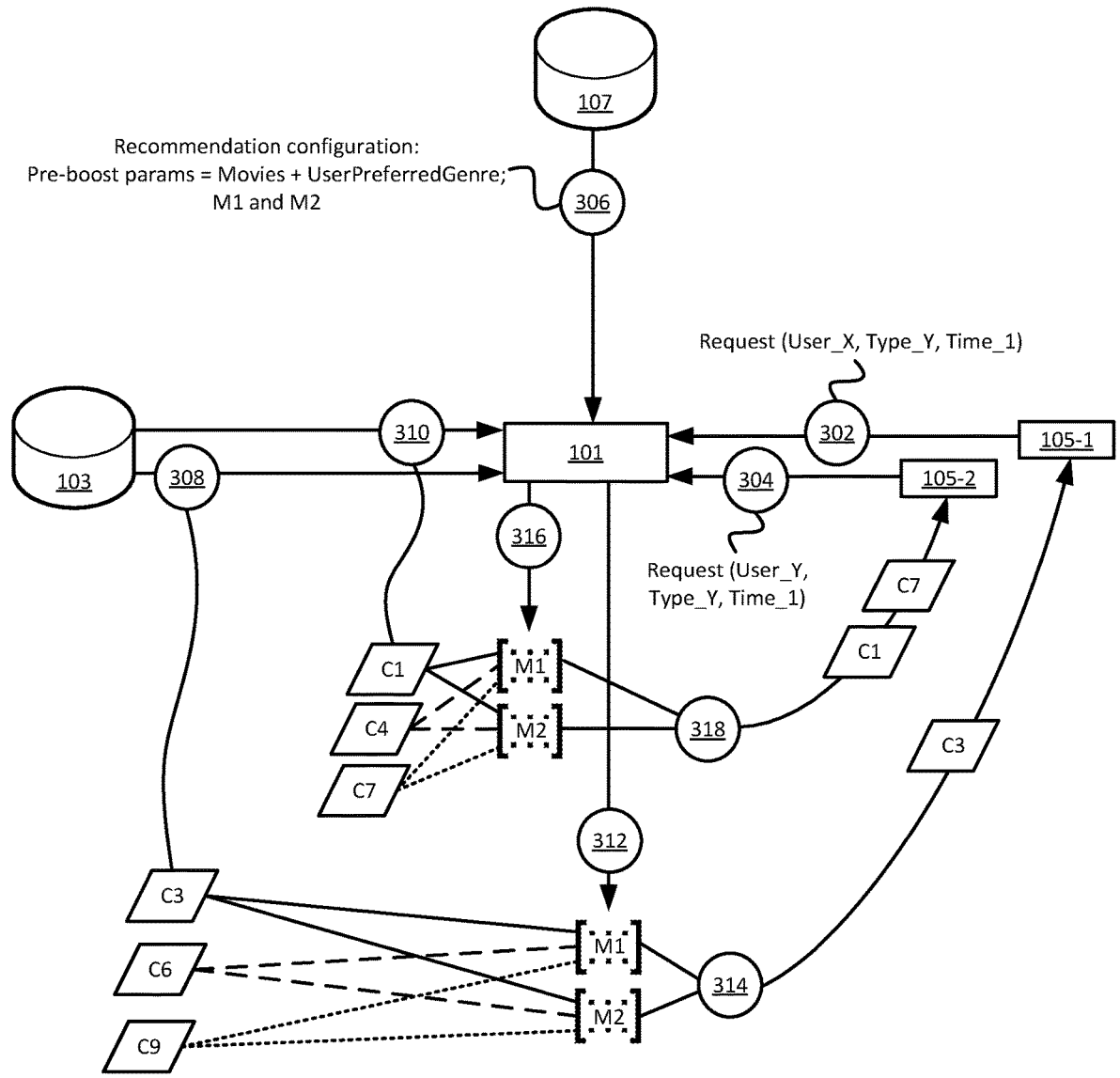
FIG. 3 illustrates an example of generating different recommendations for different users based on the dynamic content selections and the modeling of different event and content combinations in accordance with some embodiments.

FIG. 3 illustrates an example of generating different recommendations for different users based on the dynamic content selections and the modeling of different event and content combinations in accordance with some embodiments. As shown in FIG. 3, first UE 105-1 may issue (at 302) a first request for a particular type of content, and second UE 105-2 may issue (at 304) a second request for the same particular type of content. In some embodiments, the first request and the second request may include the same query and may be the same message coming from a different requestor. The first and second requests may be issued (at 302 and 304) contemporaneously or at the same time.

Given that the first request and the second request contain the same query and are directed to the same particular content type, dynamic recommendation system 101 may retrieve (at 306) the same recommendation configuration for each UE 105-1 and 105-2, and may customize the pre-boost parameters, events funnel, modeling pipeline, model evaluation, and/or other variables within the recommendation configuration differently for each UE 105-1 and 105-2 in response to a difference in the user profiles associated with first UE 105-1 and second UE 105-2, time of day at which the requests are issued, locations of first UE 105-1 and second UE 105-2, and/or another detected difference. For instance, the requested particular type of content may be for movies, and the recommendation configuration may include a pre-boost parameter that customizes the initial selection based on the user's preferred movie genre. The first user associated with first UE 105-1 may prefer horror movies, whereas the second user associated with second UE 105-2 may prefer comedy movies.

In some embodiments, dynamic recommendation system 101 may dynamically generate (at 306) different recommendation configurations in response to a difference in the user profiles associated with first UE 105-1 and second UE 105-2, time of day at which the requests are issued, locations of first UE 105-1 and second UE 105-2, and/or another detected difference. The dynamically generated recommendation configurations may include different pre-boost parameters, events funnels, modeling pipelines, modeling evaluations, and/or other differences for recommending different rails of content in response to the first and second requests.

In any case, dynamic recommendation system 101 may dynamically select (at 308) and retrieve a first set of content in response to the query of the first request and the qualification of the recommendation configuration with a first set of user preferences, and may dynamically select (at 310) and retrieve a second set of content in response to the same query of the second request and the qualification of the recommendation configuration with a different second set of user preferences.

In some embodiments, the pre-boost parameters and dynamic selection of content may yield the same set of content for the first request and the second request when the particular type of content is more granularly defined to include a specific genre, channel, etc. and does not include a conditional parameter that is based on user preferences, or when there are insufficient user preferences to differentiate the interests of the first user from the second user. For instance, the first user and the second user may be new users. In this case, dynamic recommendation system 101 may base the pre-boost selection on preferences of the aggregate set of users, and the initial set of content retrieved for the first and second users may be the same. For instance, the first and second requests may include a query for horror movies, and dynamic recommendation system 101 may retrieve the most popular horror movies in content library 103 that correspond to the most requested or most watched horror movies by all users.

The recommendation configuration(s) may specify using one or more events and a particular set of models to score the initial sets of content selected for each request, and/or a specific sequence of evaluating the particular set of models. The events used to model the selected set of content for each request may differ when the events correspond to different user preferences and/or activities tracked for the users of first UE 105-1 and second UE 105-2.

Accordingly, modeling (at 312) the first set of content against the one or more events using the particular set of models and evaluating (at 314) the resulting models according to the sequencing specified in the recommendation configuration may produce a first ranking and/or recommendation of a first subset of the first set of content. Modeling (at 316) the second set of content against the one or more events using the particular set of models and evaluating (at 318) the resulting models according to the sequencing specified in the recommendation configuration may produce a second ranking and/or recommendation of a second subset of the second set of content that is different than the content and ordering of the first subset of content. Consequently, dynamic recommendation system 101 may generate and present different recommendations for the first request of first UE 105-1 than for the second request of second UE 105-2 despite the first and second requests being identical and/or dynamic recommendation system 101 using the same recommendation configuration to generate the recommendations for the requests.

The selector of a particular recommendation configuration may define or list one or more content types that are to be modeled using that particular recommendation configuration. For instance, a selector defined as "Linear_Movies" may identify the recommendation configuration for requests directed to movies that are streaming live on one or more channels or feeds, whereas a selector defined as "VOD_Movies" may identify the recommendation configuration to apply against movies that are accessible on-demand.

Figure 4:
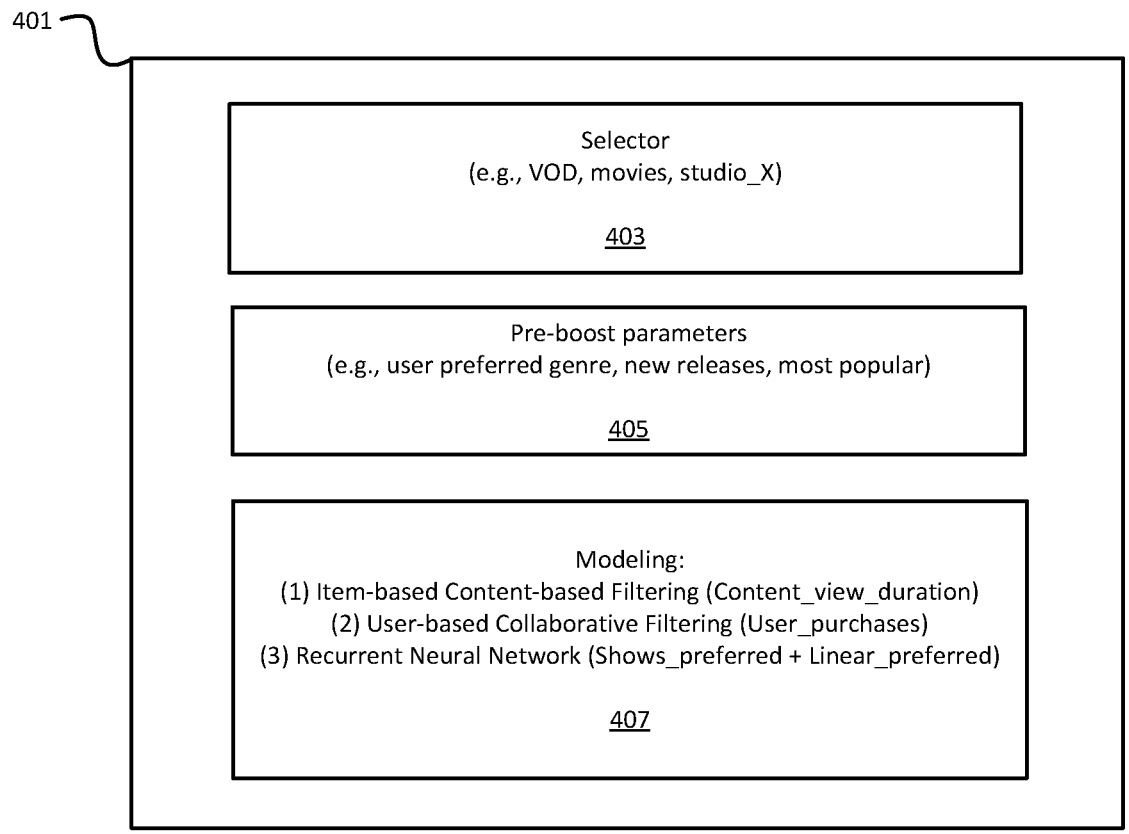
FIG. 4 presents an example structure for the recommendation configurations of some embodiments presented herein.

FIG. 4 presents an example structure for different recommendation configurations that define the customized content selections and customized modeling performed by dynamic recommendation system 101 in accordance with some embodiments presented herein. Each recommendation configuration 401 may include a selector 403, pre-boost parameters 405, and/or a set of models 407 in a specified sequence of evaluation.

Selector 403 may map recommendation configuration 401 and/or specify usage of recommendation configuration 401 for different content types and/or queries. Accordingly, selector 403 may include values that match to different content types or request queries (e.g., "horror movies", "comedy movies", "movies starring a particular actor", "movies released by a particular studio", etc.), UE addressing, UE locations, UE device types, user preferences, tracked user activity, and/or other data that dynamic recommendation system 101 may obtain at the time a request arrives.

In some embodiments, selector 403 may be defined with different specificity or granularity to limit which recommendation configurations 401 dynamic recommendation system 101 uses to generate recommendations for different requests. For instance, selector 403 defined as "Movies" may identify a recommendation configuration that applies to all movies (e.g., linear and VOD), whereas selector 403 defined as "Linear_Movies" may identify a recommendation configuration for a subset of live streaming movies. In some such embodiments, dynamic recommendation system 101 may select the more specific recommendation configuration when receiving a request for a content type that matches selector 403 of two or more recommendation configurations 401. In some other embodiments, dynamic recommendation system 101 may select all recommendation configurations 401 with selectors 403 that match the requested content type, and may score the selected initial set of content using each of the selected recommendation configurations 401.

Pre-boost parameters 405 may customize the selection of a set of content that is to be used as the basis for subsequent recommendations produced by the specified modeling of the selected set of content in recommendation configuration 401. Pre-boost parameters 405 may prioritize the selection of certain content as the initial set of content for a particular request or a particular requested content type.

In some embodiments, pre-boost parameters 405 may be user-specific and may be defined from preferences of the requesting user. For instance, recommendation configuration 401 with selector 403 for "VOD_Movies" may include pre-boost parameters 405 that prioritize the selection of on-demand movies based on user preferences. The user profile for the requesting user may specify a preference for horror movies. Accordingly, the initial content selection based on pre-boost parameters 405 may include prioritizing the selection of on-demand movies that are categorized as horror movies over other on-demand movies that may be stored in content library 103.

In some embodiments, pre-boost parameters 405 may be content-specific. For instance, recommendation configuration 401 with selector 403 for "VOD_Movies" may include pre-boost parameters 405 that prioritize the selection of newer on-demand movies over older on-demand movies. In this instance, dynamic recommendation system 101 may retrieve the "VOD_Movies" recommendation configuration 401 in response to a request for on-demand movies, may inspect pre-boost parameters 405 of that selected recommendation configuration 401, and may query for on-demand movies that were added to content library 103 in the last month. Other content-specific pre-boost parameters 405 may be defined according to aggregate user preferences. For instance, content-specific pre-boost parameters 405 may prioritize the selection of the most popular content (e.g., most requested, most frequently accessed, longest aggregate view time, etc.) for a requested content type.

Set of models 407 may correspond to a modeling definition within recommendation configuration 401 for scoring, ranking, and/or reordering the set of content that is selected according to pre-boost parameters 405. Set of models 407 may include matrices or vectors that are generated from content-based filtering (e.g., ICBF and/or UCBF), collaborating filtering (e.g., ICF and/or UCF), neural networks (e.g., CNNs, RNNs, and/or DNNs), and/or other modeling techniques.

Each model of set of models 407 may be generated by calculating a proximity, similarity, or relevance score between the set of content selected using pre-boost parameters 405 and a different event that is defined for that model by the modeling definition. The events may include tracked activity or preferences of the requesting user or a group of users. For instance, set of models 407 may specify generating a first model that uses content-based filtering to score the similarity between the selected set of content and content previously purchased by the requestor, a second model that uses collaborative filtering to score the relevance between the selected set of content and "liked" events tracked for the requestor (e.g., liked content, bookmarked content, followed content, etc.), and a third model that uses a RNN to measure similarity between the selected set of content and the most popular content identified by the aggregate set of users.

In some embodiments, generating a model may include creating a vector or matrix with entries that score different content from the selected set of content based on the content's proximity, similarity, and/or relevance to a user preference, content preference, or other event. For instance, a model that is generated by performing content-based filtering of a particular genre may include a vector with a first entry that scores the similarity of a first content to the particular genre, and a second entry that scores the similarity of a second content to the particular genre. The entries may have values between 0 and 1, wherein a value of 1 indicates an exact match of the content to the particular genre, a value of 0.5 indicates a partial match (e.g., the content is classified to fall in the particular genre and another genre), and a value of 0 indicates no match (e.g., the content pertains to altogether different genre than the particular genre).

The sequencing specified for set of models 407 may define an evaluation order for the generated models. Changing the evaluation order may alter the recommendations that are output by dynamic recommendation system 101, and/or the ranking and ordering for the content that is presented in response to a request. For instance, a first model may be used to filter out a first subset of the selected set of content that scores lowest in the first model and to retain a second subset of the selected set of content that scores highest in the first model. The second subset of content may then be scored and ranked according to a second model. However, if the second model was evaluated before the first model, then a different subset of the selected set of content may be retained and ranked using the first model.

In some embodiments, the model evaluation may include scoring each content from the selected initial set of content using each of the defined set of models 407. For each individual model, the content is ranked in the order of highest relevance to the requesting user. Each model may generate a list that ranks the set of content differently. Once the individual lists are reordered, an interleaving technique may be applied to merge the individual lists. The interleaving technique may include summing the scores generated for the same content by the different models, and ordering the content according from the largest cumulative scores to the smallest cumulative scores. In some embodiments, the interleaving technique may include combining the lists produced by sequentially ordered models in a round robin fashion, and then deduplicating the combined results.

Figure 5:
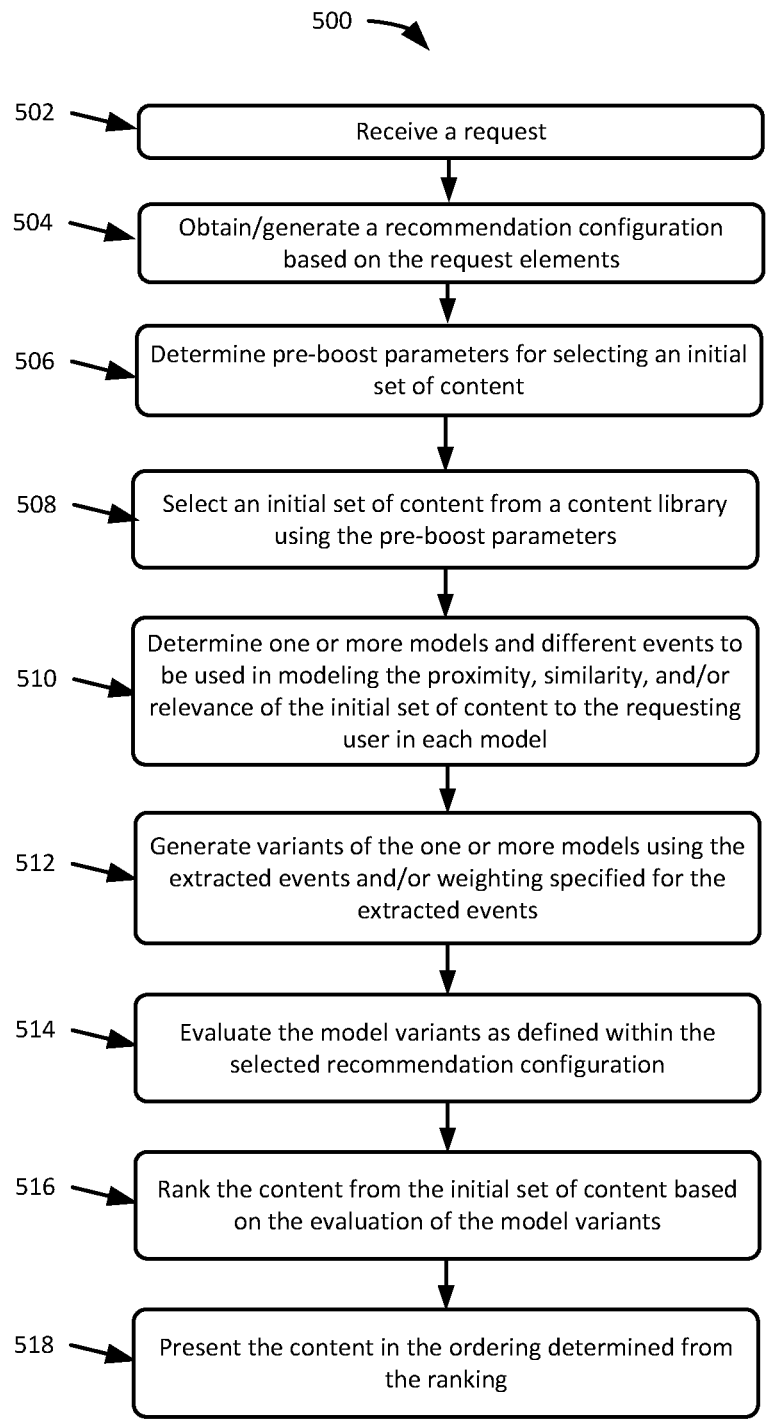
FIG. 5 presents a process for generating personalized recommendations according to a selected recommendation configuration in accordance with some embodiments presented herein.

FIG. 5 presents a process 500 for generating personalized recommendations according to a selected recommendation configuration in accordance with some embodiments presented herein. Process 500 may be implemented by dynamic recommendation system 101, and/or for a platform that may be used to purchase, rent, view, and/or otherwise access different content, items, and/or services. For instance, process 500 may be performed by dynamic recommendation system 101 to generate content recommendations for users of a linear or VOD streaming platform, or to generate item recommendations for users of an online merchant or shopping platform.

Process 500 may include receiving (at 502) a request from a UE over a data network. The request may include one or more identifiers that identify the UE or a user associated with the UE, and a query for a particular item or content or for a particular type of item or content. The identifier may include network addressing, login information, device signature, and/or other values included with the request (e.g., the request header, body, metadata, etc.) that may be used to identify the requesting UE or user. The query may be specified as textual string or as an encoded value.

Process 500 may include obtaining and/or generating (at 504) one or more recommendation configurations based on the request elements. In some embodiments, the request query may be a request element that directly or indirectly maps to a stored recommendation configuration. For instance, the query may specify a request for VOD action movies, and dynamic recommendation system 101 may store a recommendation configuration with a selector for "VOD_Movies" or "VOD_Movies_Action". In some other embodiments, dynamic recommendation system 101 may hash the request identifier and/or otherwise map the request identifier to a specific stored user profile. For instance, the request identifier may include a token or a value that identifies a particular user after that particular user has been authenticated for access, and dynamic recommendation system 101 may use the token or value to retrieve the user profile for that particular user. The user profile may store prior tracked activity and/or preferences of the particular user. In some embodiments, dynamic recommendation system 101 may generate a recommendation configuration based on the data within the user profile and/or system data that is collected for the available content, models, and/or events within dynamic recommendation system 101. In some other embodiments, dynamic recommendation system 101 may add to or qualify the request query using the tracked activity and/or preferences from the user profile. For instance, the request query may simply include a request for accessing movies. The user profile may store user preferences that indicate a preference for action movies involving espionage and a particular movie studio. In this example, dynamic recommendation system 101 may generate a first recommendation configuration selector "VOD_Movies_Action_Espionage" and/or a second recommendation configuration selector "VOD_Movies_StudioX" from the request query and the user preferences in the user profile.

Process 500 may include determining (at 506) pre-boost parameters for selecting an initial set of content from content library 103. In some embodiments, the pre-boost parameters may be specified in each of the one or more recommendation configurations. For instance, a recommendation configuration may specify selecting the initial set of content to include content of a particular genre, a particular channel, and/or with a specific release date or airing time. In some other embodiments, the recommendation configuration may specify selecting the initial set of content using one or more user preferences. For instance, a recommendation configuration may specify boosting the genre type, but does not specifically list which genre to use in selecting the initial set of content. Dynamic recommendation system 101 may obtain and scan the user profile that is associated with the requesting UE in order to identify a preferred genre to use for the selection of the initial set of content.

Process 500 may include selecting (at 508) an initial set of content from content library 103 using the pre-boost parameters. Selecting (at 508) the initial set of content may include querying, retrieving, and/or filtering different content from content library 103 that matches one or more of the pre-boost parameters. In some embodiments, the content may be stored or identified in content library 103 with tags and/or metadata. The tags and/or metadata may enumerate the content type, and/or may provide various attributes that differentiate and/or identify the content from other content. The pre-boost parameters may be matched against these tags and/or metadata.

Process 500 may include determining (at 510) one or more models that are specified in the one or more recommendation configurations, and different events to be used in modeling the proximity, similarity, and/or relevance of the initial set of content to the requesting user in each model. For instance, a recommendation configuration may specify a first content-based filtering model that gauges relevance of each content in the initial set of content based on the view duration or view percentage tracked in the user profile for similar previously viewed content, and may specify a second collaborative filtering model that gauges content relevance based on past purchases and/or rentals for similar content. The different events may correspond to a subset of prior activity or preferences that dynamic recommendation system 101, content/item platform, and/or another system tracks for the requesting user and enters into a user profile that is created for that requesting user. In some embodiments, dynamic recommendation system 101 may adjust the weighting of the events that are used to generate a particular model based on the relative importance or impact that each event is to have on that particular model.

Process 500 may include generating (at 512) variants of the one or more models using the extracted events and/or weighting specified for the extracted events. Generating (at 512) the variants may include calculating a score for the proximity, similarity, and/or relevance between each content from the initial set of content and the one or more events specified for a model. In particular, generating (at 512) the variants may include producing a vector, matrix, and/or other data structure with values that measure the similarity between particular content from the initial set of content and the event that qualifies past activities or preferences of the requesting user. In some embodiments, the modeling may include extracting keywords or identifiers of the selected content, and using doc2vec, word2vec, Bidirectional Encoder Representation from Transformers ("BERT"), Term Frequency-Inverse Document Frequency ("TF-IDF"), and/or machine learning techniques to measure and/or quantify the proximity, similarity, and/or relevance between the extracted keywords or identifiers and the specified event as a score.

Process 500 may include evaluating (at 514) the model variants as defined within the recommendation configuration. In some embodiments, different interleaving techniques may be used to evaluate (at 514) the model variants. For instance, a first recommendation configuration may specify evaluating the model variants by taking the dot product of the model variants in a particular order, a second recommendation configuration may specify evaluating the model variants by summing the scores produced from each model variant, and a third recommendation configuration may specify evaluating the model variants by scoring the initial set of content using a first model variant, removing content that scores below a certain threshold, and scoring the remaining content using a second model variant.

Process 500 may include ranking (at 516) the content from the initial set of content based on the evaluation (at 516) of the model variants. In some embodiments, the ranking (at 516) may include summing, averaging, or otherwise calculating a cumulative score for the initial set of content based on individual component scores from each model variant, and determining the content that is of most interest and/or relevance to the requesting user based on the cumulative scores. In some other embodiments, the ranking (at 516) may include ordering the initial set of content based on degree by which each content from the initial set of content is determined to match an event modeled within the different model variants.

In some embodiments, a post-filtering operation may be performed to further refine the ranking or ordering of the selected content. The post-filtering operation may account for additional entitlements that may be prioritized by dynamic recommendation system 101 and that may not be accounted for in one or more of the model variants. For instance, the ranked list of content may be sorted based on airing time, the channels used to access the content, genre, and/or other content types or categories. The post-filtering operation may also sort the ranked list of content based on previous viewing history, purchases, rentals, likes, and/or other tracked activity or preferences from the user profile that is not accounted for in the model variants.

Process 500 may include presenting (at 518) the content in the ordering determined from the ranking (at 516) to the requesting UE. Accordingly, the output from dynamic recommendation system 101 may provide content that is relevant to the original request or query from a user, and that is further ordered or ranked according to different user and/or content preferences. Consequently, the content that matches the user query and that is predicted to be of most interest or relevance to the user may be presented first, whereas content that matches the user query and that is predicted to be of lesser interest or relevance to the user may be presented later.

Figure 6:
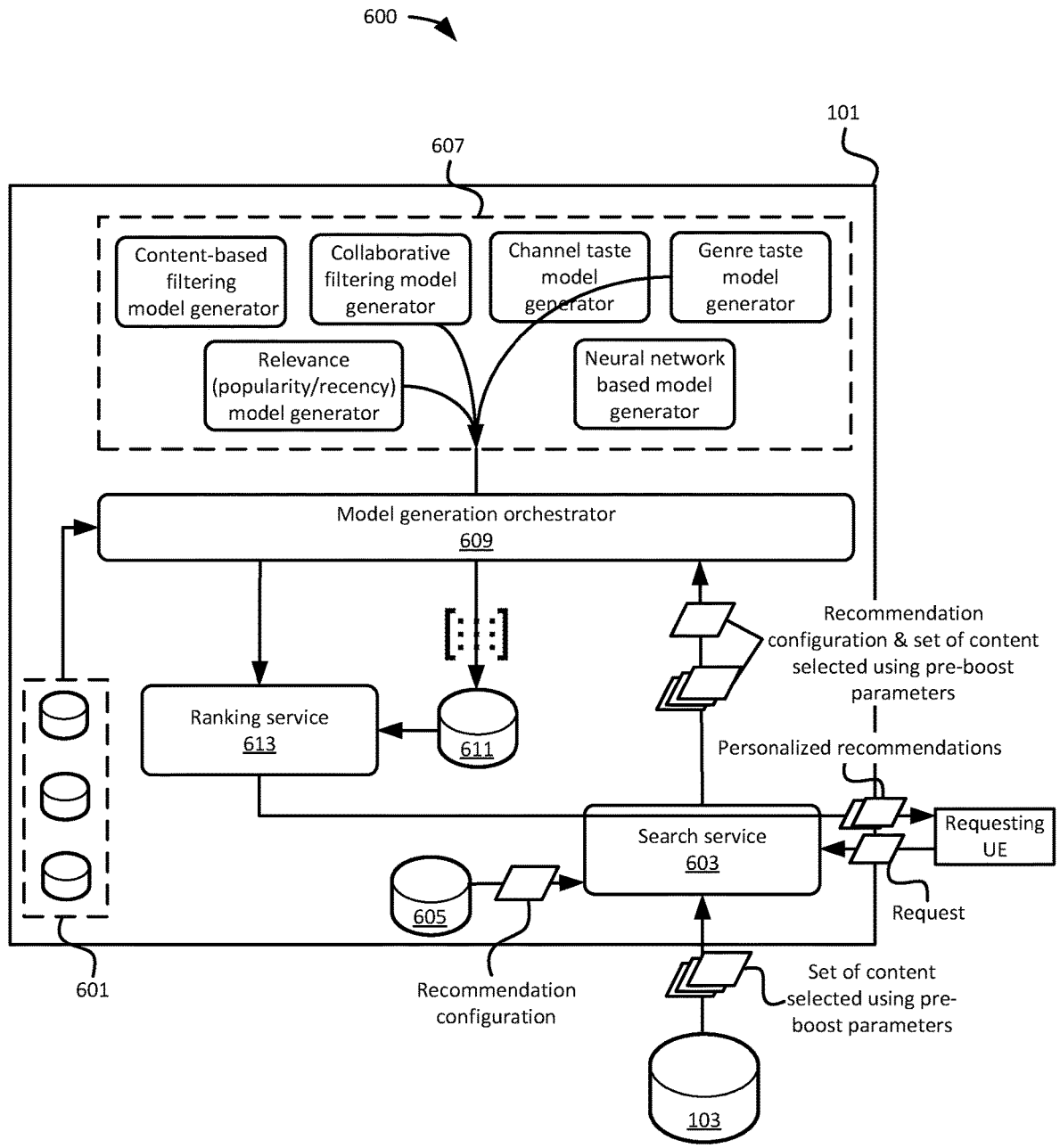
FIG. 6 illustrates an example architecture for the dynamic recommendation system of some embodiments presented herein.

FIG. 6 illustrates an example architecture 600 for dynamic recommendation system 101 in accordance with some embodiments presented herein. As shown in FIG. 6, dynamic recommendation system 101 may include one or more datastores 601, search service 603, recommendation configuration repository 605, one or more model generators 607, model generation orchestrator 609, model store 611, and ranking service 613.

Datastores 601 may include databases or storage elements that store aggregated user events, individual user events, and/or content metadata. The aggregated user events may include cumulative tracked activity and/or preferences that dynamic recommendation system 101 compiles for all or groups of users accessing the system. The cumulative tracked activity and/or preferences may be derived from the individual user events, and/or may define cumulative preferences such as the most popular content, the most frequently accessed content, the most recently accessed content, different times at which different content is accessed, and/or other cumulative access statistics for the content. The individual user events may include tracked activity and/or preferences for each individual user. The tracked activity and/or preferences for each individual user may include logged actions of that user and/or metrics associated with that user. For instance, the logged actions may include the number of times the user has selected different content, the content view duration, past purchases, past rentals, times and durations the user accessed the system, and/or directly trackable activity and/or preferences. The tracked activity and/or preferences may also include derived elements such as a preferred actor, a preferred director, a preferred studio, preferred viewing times, preferred channels, preferred genres, and/or other conclusions that are determined from the logged actions and/or tracked metrics of the user. The content metadata may identify and/or differentiate the different accessible content, and may include values that specify the content type. For instance, the metadata for particular content may specify the particular content type to be a VOD action movie from a specific studio in a specify genre starring one or more actors.

Search service 603 may select the initial set of content from content library 103 that matches the query submitted by a UE. Selecting the initial set of content may include selecting a recommendation configuration from recommendation configuration repository 605 using the identifier and/or query accompanying a received request, determining pre-boost parameters from prioritized content metadata listed in the selected recommendation configuration and/or from user preferences specified within a user profile, and retrieving the initial set of content from content library 103 that match the pre-boost parameters. Search service 603 may provide the initial set of content and the selected recommendation configuration to model generation orchestrator 609.

Model generation orchestrator 609 may determine which models to generate based on the recommendation configuration definition. In particular, model generation orchestrator 609 may task different sets of model generators 607 to generate the different models using different filtered events from the datastores 601.

Model generators 607 may include a content-based filtering model generator, a collaborating filtering model generator, a channel taste model generator, a genre taste model generator, a relevance model generator, different neural network model generators, and/or other model generators that determine and/or measure the proximity, similarity, and/or relevance between a filtered subset of events and the different content within the initial set of content. Each model generator 607 may measure the proximity, similarity, and/or relevance in a different manner, using different comparisons, and/or using different mathematically techniques. Accordingly, the content-based filtering model generator may model the similarity between a particular event and a particular content differently than the collaborative filtering model generator. Model generators 607 may generate vectors or matrices that score the similarity between different events and different content, and may output the resulting models to model store.

Architecture 600 is scalable such that model generator orchestrator 609 may generate additional or different models using new or different model generators 607 that are incorporated into architecture 600 at different times. For instance, model generation orchestrator 609 may use a first model generator 607 to generate a first content-based filtering model based on a first user preference (e.g., genre preference), and a second model generator 607 to generate a second collaborative filtering model based on aggregate user preferences for the most popular content. Architecture 600 may later be scaled to add a third model generator 607 that model generation orchestrator 609 uses to generate a third content filtering model based on a second user preference (e.g., preferences for a specific director or actor). Additional model generators 607 may be incorporated at any time for different content types and for preferences or variables that are specified with different conditions, granularity, and/or specificity.

Model generation orchestrator 609 may signal ranking service 613 once the models for a particular request have been generated. Ranking service 613 may retrieve the models from model store 611. Ranking service 613 may evaluate the models, and may rank or order the initial set of content selected by search service 603 according to the model evaluation. Ranking service 613 may provide the ranked results to the requesting UE.

Figure 7:
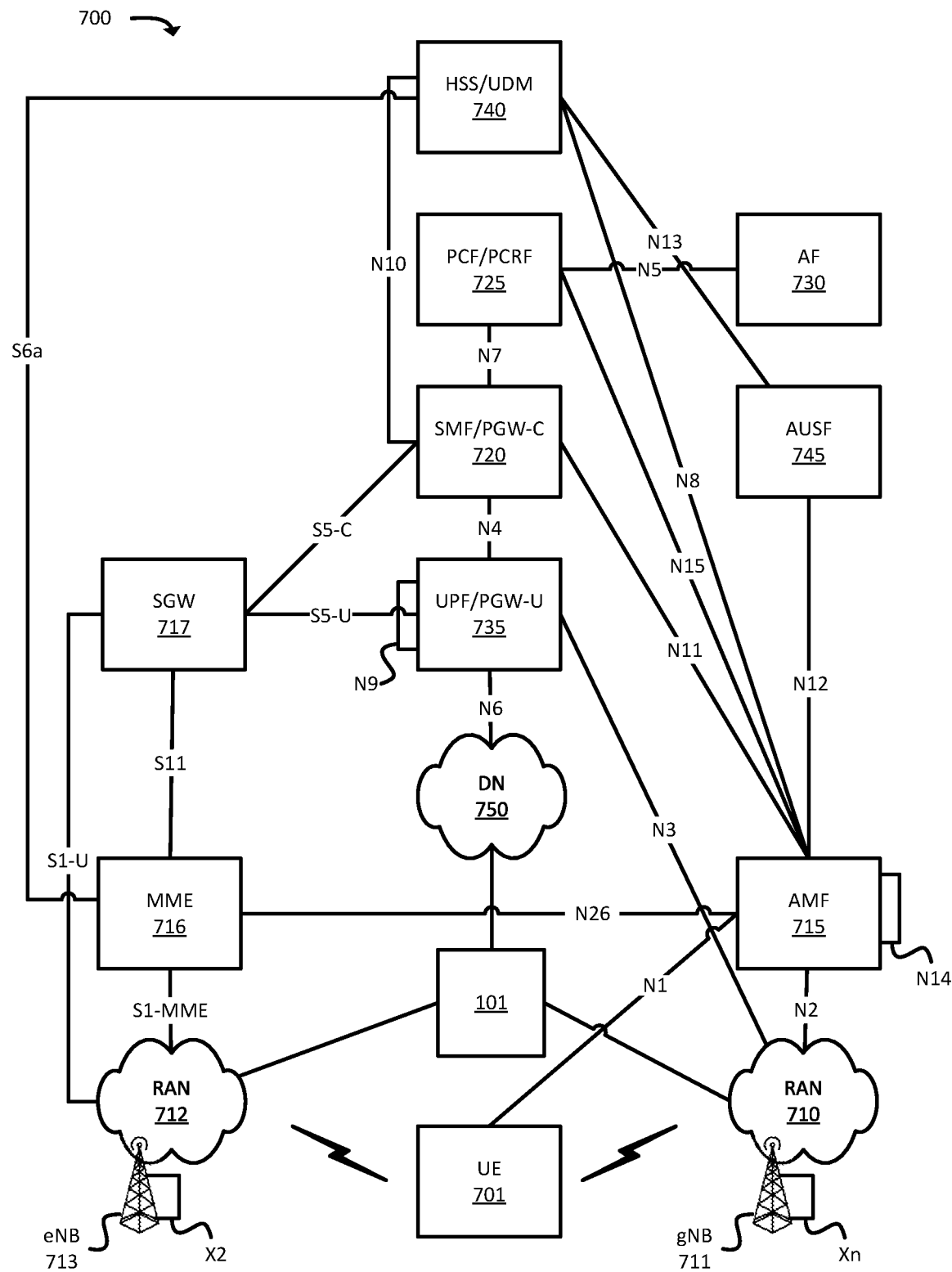
FIG. 7 illustrates an example environment, in which one or more embodiments may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MIME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as dynamic recommendation system 101.

The example shown in FIG. 7 illustrates one instance of each network component or function (e.g., one instance of SMF/PGW-C 720, PCF/PCRF 725, UPF/PGW-U 735, HSS/UDM 740, and/or 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or 745, while another slice may include a second instance of SMF/PGW-C 720, PCF/PCRF 725, UPF/PGW-U 735, HSS/UDM 740, and/or 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, front-end interfaces, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 701 may send traffic to and/or receive traffic (e.g., user plane traffic) from DN 750 via RAN 710, RAN 712, and/or UPF/PGW-U 735. In some embodiments, UE 701 may include the devices that request different content, items, content types, or item types from a content or item platform within DN 750.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N8 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. For instance, UEs 701 may issue requests for different content or items from one or more platforms located within DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Dynamic recommendation system 101 may interface with one or more content or item distribution platforms in DN 750 in order to generate the personalized recommendations for those platforms. In some embodiments, dynamic recommendation system 101 may be located at the network edge or at different Multi-Access/Mobile Edge Computing ("MEC") sites of the network, may be used to generate the personalized recommendations for the content or item distribution platforms, and may post-process the recommendation to further account for the originating location of each request.

Figure 8:
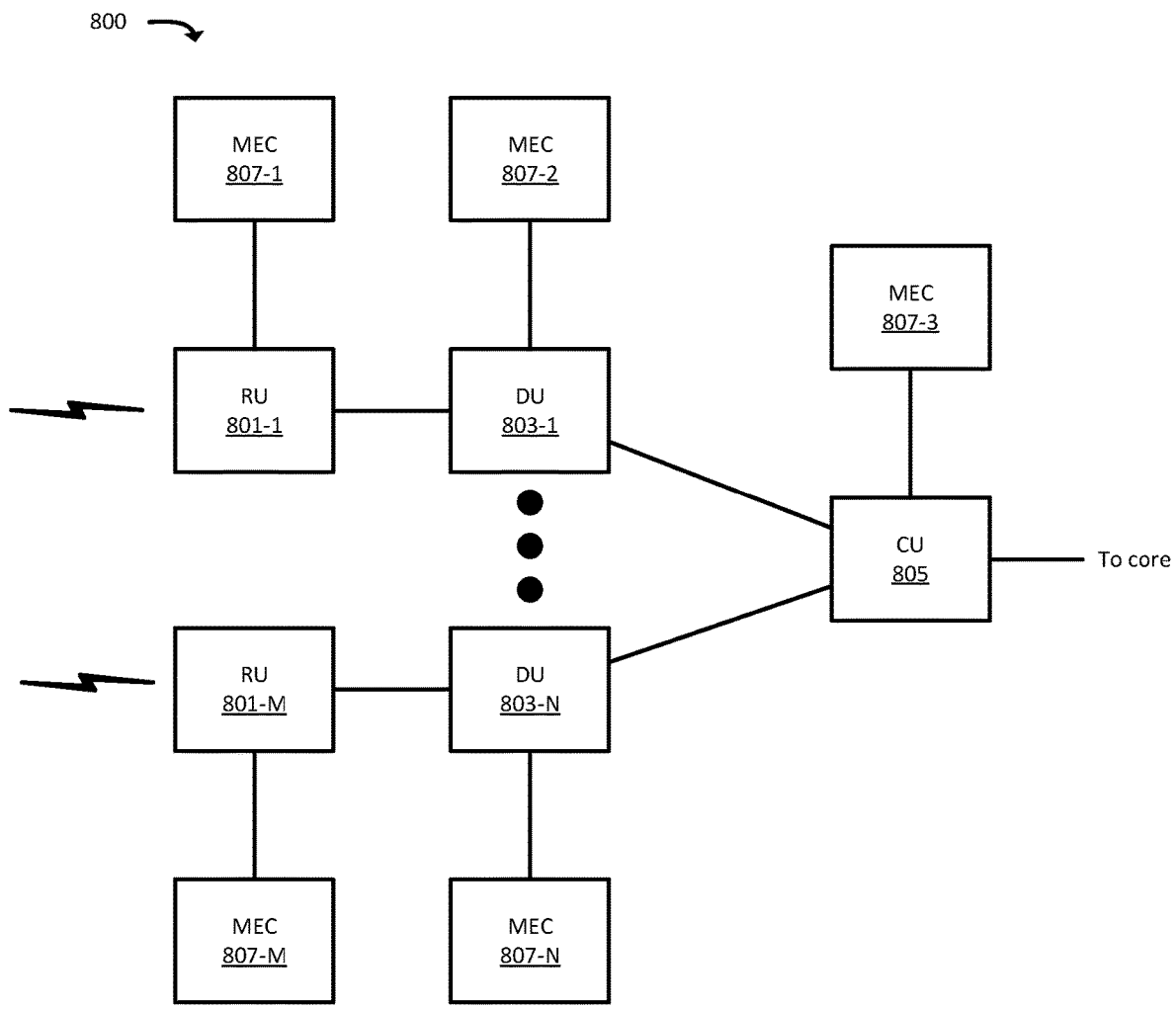
FIG. 8 illustrates an example arrangement of a Radio Access Network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("Rus") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more MEC devices or sites, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network.

Figure 9:
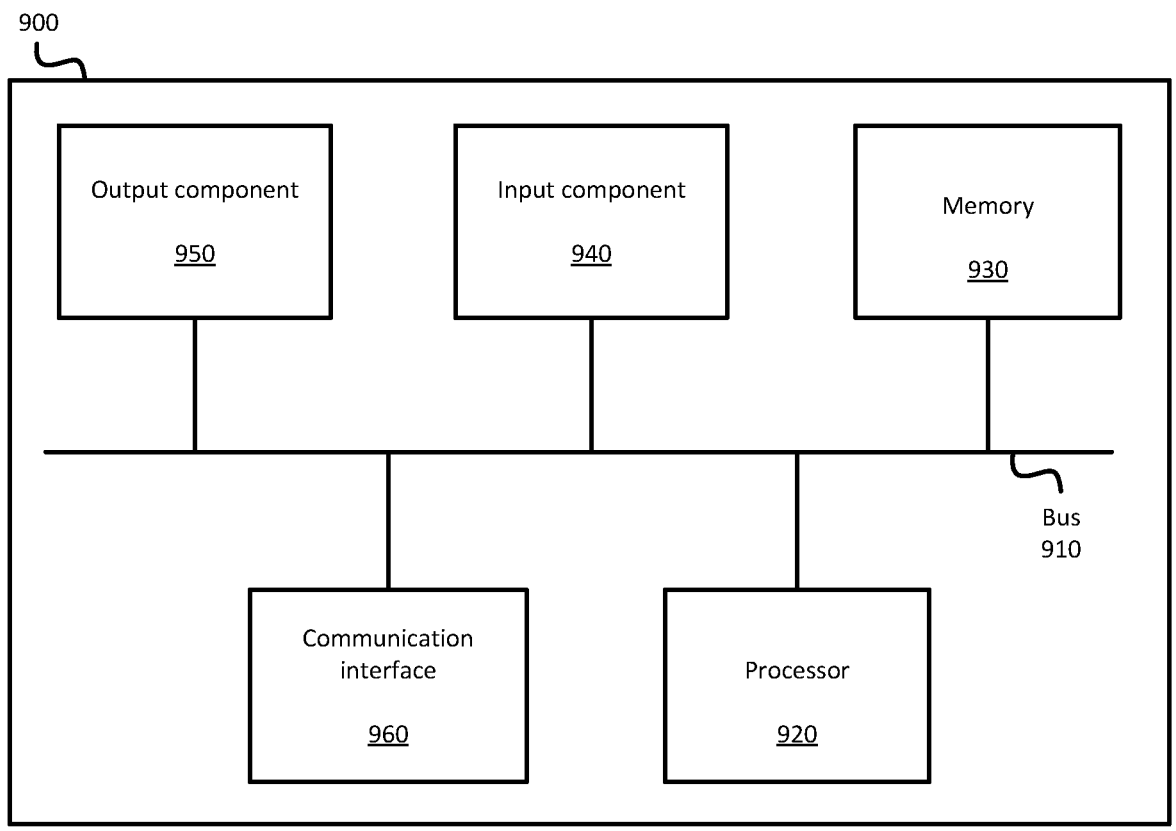
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or,"

as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain a plurality of recommendation configurations, wherein each respective recommendation configuration includes:
a respective set of selector criteria based on which the respective recommendation configuration is selected from the plurality of recommendation configurations,
a respective set of pre-boost parameters specifying criteria based on which content can be selected from a plurality of content and can further be prioritized,
a respective set of models to apply to content selected and prioritized according to the respective set of pre-boost parameters, wherein different recommendation configurations include different sets of models;
receive a request comprising a query and an identifier that identifies a requestor issuing the request;
compare the query and the identifier of the requestor to the respective sets of selector criteria associated with the plurality of recommendation configurations;
select a particular recommendation configuration based on comparing the query and the identifier of the requestor to the respective sets of selector criteria;
retrieve a set of content from a plurality of accessible content based on each content in the set of content satisfying the query and the set of pre-boost parameters included in the particular recommendation configuration;
prioritize the retrieved set of content in a first order based on the set of pre-boost parameters included in the particular recommendation configuration;
apply the respective set of models, associated with the particular recommendation configuration, to the set of content; and
present recommended content in a second order, that is different than the first order, based on applying the respective set of models, associated with the particular recommendation configuration that was selected based on the comparing, to the retrieved set of content.

2. The device of claim 1,
wherein the particular recommendation configuration specifies content-based filtering of the set of content against a first event, and collaborative filtering of the set of content against a second event, and
wherein applying the respective set of models comprises:
modeling a first set of relevance scores based on the content-based filtering of the set of content against the first event; and
modeling a second set of relevance scores based on the collaborative filtering of the set of content against the second event.

3. The device of claim 1, wherein the one or more processors are further configured to:

evaluate the set of models according to an interleaving technique specified in the particular recommendation configuration;
rank the set of content based on results from evaluating the set of models; and
determine the second order for the recommended content based on the ranking of the set of content.

4. The device of claim 1, wherein the one or more processors are further configured to:
obtain one or more preferences of the requestor;
modify at least one parameter of the one or more parameters using a particular preference from the one or more preferences; and
query a content repository for the set of content using the query modified with the particular preference.

5. The device of claim 1, wherein the one or more processors are further configured to:
obtain one or more preferences of the requestor; and
prioritize selection of content from the plurality of accessible content that satisfies the query and that further satisfies the one or more preferences that are not specified in the query.

6. The device of claim 1, wherein selecting the particular recommendation configuration comprises:
selecting a first recommendation configuration, including a first set of models, as the particular recommendation configuration in response to one or more of the request being issued by the requestor at a first time; and
selecting a second recommendation configuration, including a second set of models, as the particular recommendation configuration in response to one or more of the request being issued by the requestor at a second time that is different from the first time.

7. The device of claim 1,
wherein selector criteria for a first recommendation configuration of the plurality of recommendation configurations includes a first content type, and
wherein selector criteria for a second recommendation configuration of the plurality of recommendation configurations includes a second content type.

8. A non-transitory computer-readable medium, storing a plurality of processor executable instructions to:
maintain a plurality of recommendation configurations, wherein each respective recommendation configuration includes:
a respective set of selector criteria based on which the respective recommendation configuration is selected from the plurality of recommendation configurations,
a respective set of pre-boost parameters specifying criteria based on which content can be selected from a plurality of content and can further be prioritized,
a respective set of models to apply to content selected and prioritized according to the respective set of pre-boost parameters, wherein different recommendation configurations include different sets of models;
receive a request comprising a query and an identifier that identifies a requestor issuing the request;
compare the query and the identifier of the requestor to the respective sets of selector criteria associated with the plurality of recommendation configurations;
select a particular recommendation configuration based on comparing the query and the identifier of the requestor to a the respective sets of selector criteria;
retrieve a set of content from a plurality of accessible content based on each content in the set of content satisfying the query and the set of pre-boost parameters included in the particular recommendation configuration;
prioritize the retrieved set of content in a first order based on the set of pre-boost parameters included in the particular recommendation configuration;
apply the respective set of models, associated with the particular recommendation configuration, to the set of content; and
present recommended content in a second order, that is different than the first order, based on applying the respective set of models, associated with the particular recommendation configuration that was selected based on the comparing, to the retrieved set of content.

9. The non-transitory computer-readable medium of claim 8,
wherein the particular recommendation configuration specifies content-based filtering of the set of content against a first event, and collaborative filtering of the set of content against a second event; and
wherein applying the respective set of models comprises:
modeling a first set of relevance scores based on the content-based filtering of the set of content against the first event; and
modeling a second set of relevance scores based on the collaborative filtering of the set of content against the second event.

10. The non-transitory computer-readable medium of claim 8, wherein the plurality of processor-executable instructions further include instructions to:
evaluate the set of models according to an interleaving technique specified in the particular recommendation configuration;
rank the set of content based on results from evaluating the set of models; and
determine the second order for the recommended content based on the ranking of the set of content.

11. The non-transitory computer-readable medium of claim 8, wherein the plurality of processor-executable instructions further include instructions to:
obtain one or more preferences of the requestor;
modify at least one parameter of the one or more parameters using a particular preference from the one or more preferences; and
query a content repository for the set of content using the query modified with the particular preference.

12. The non-transitory computer-readable medium of claim 8, wherein the plurality of processor-executable instructions further include instructions to:
obtain one or more preferences of the requestor; and
prioritize selection of content from the plurality of accessible content that satisfies the query and that further satisfies the one or more preferences that are not specified in the query.

13. The non-transitory computer-readable medium of claim 8, wherein selecting the particular recommendation configuration comprises:
selecting a first recommendation configuration, including a first set of models, as the particular recommendation configuration in response to one or more of the request being issued by the requestor at a first time; and
selecting a second recommendation configuration, including a second set of models, as the particular recommendation configuration in response to one or more of the request being issued by the requestor at a second time that is different from the first time.

14. A method, comprising:
maintaining a plurality of recommendation configurations, wherein each respective recommendation configuration includes:
a respective set of selector criteria based on which the respective recommendation configuration is selected from the plurality of recommendation configurations,
a respective set of pre-boost parameters specifying criteria based on which content can be selected from a plurality of content and can further be prioritized,
a respective set of models to apply to content selected and prioritized according to the respective set of pre-boost parameters, wherein different recommendation configurations include different sets of models;
receiving a request comprising a query and an identifier that identifies a requestor issuing the request;
comparing the query and the identifier of the requestor to the respective sets of selector criteria associated with the plurality of recommendation configurations;
selecting a particular recommendation configuration based on comparing the query and the identifier of the requestor to the respective sets of selector criteria;
retrieving a set of content from a plurality of accessible content based on each content in the set of content satisfying the query and the set of pre-boost parameters included in the particular recommendation configuration;
prioritizing the retrieved set of content in a first order based on the set of pre-boost parameters included in the particular recommendation configuration;
applying the respective set of models, associated with the particular recommendation configuration, to the set of content; and
presenting recommended content in a second order, that is different than the first order, based on applying the respective set of models, associated with the particular recommendation configuration that was selected based on the comparing, to the retrieved set of content.

15. The method of claim 14, further comprising:
obtaining one or more preferences of the requestor;
modifying at least one parameter of the one or more parameters using a particular preference from the one or more preferences; and
querying a content repository for the set of content using the query modified with the particular preference.

16. The method of claim 14, further comprising:
obtaining one or more preferences of the requestor; and
prioritizing selection of content from the plurality of accessible content that satisfies the query and that further satisfies the one or more preferences that are not specified in the query.

17. The method of claim 14, wherein selecting the particular recommendation configuration comprises:
selecting a first recommendation configuration, including a first set of models, as the particular recommendation configuration in response to one or more of the request being issued by the requestor at a first time; and
selecting a second recommendation configuration, including a second set of models, as the particular recommendation configuration in response to one or more of the request being issued by the requestor at a second time that is different from the first time.

18. The method of claim 14, wherein obtaining the particular recommendation configuration comprises:

wherein selector criteria for a first recommendation configuration of the plurality of recommendation configurations includes a first content type, and wherein selector criteria for a second recommendation configuration of the plurality of recommendation configurations includes a second content type.

19. The method of claim 14, wherein the particular recommendation configuration specifies content-based filtering of the set of content against a first event, and collaborative filtering of the set of content against a second event, and wherein applying the respective set of models comprises:
   modeling a first set of relevance scores based on the content-based filtering of the set of content against the first event; and
   modeling a second set of relevance scores based on the collaborative filtering of the set of content against the second event.

20. The method of claim 14, further comprising:

evaluating the set of models according to an interleaving technique specified in the particular recommendation configuration;

ranking the set of content based on results from evaluating the set of models; and determining the second order for the recommended content based on the ranking of the set of content.

* * * * *